(12) United States Patent
Bagnall et al.

(10) Patent No.: US 10,240,536 B2
(45) Date of Patent: Mar. 26, 2019

(54) FLUID SYSTEM

(71) Applicant: ROLLS-ROYCE PLC, London (GB)

(72) Inventors: Adam MacGregor Bagnall, Derby (GB); Peter Beecroft, Derby (GB); Richard Geoffrey Stretton, Derby (GB); Philip Geoffrey Woodrow, Derby (GB); Stephane Michel Marcel Baralon, Derby (GB); Angus Roy Smith, Derby (GB)

(73) Assignee: ROLLS-ROYCE plc, London (GB)

( * ) Notice: Subject to any disclaimer, the term of this patent is extended or adjusted under 35 U.S.C. 154(b) by 469 days.

(21) Appl. No.: 14/695,918

(22) Filed: Apr. 24, 2015

(65) Prior Publication Data
US 2015/0330309 A1 Nov. 19, 2015

(30) Foreign Application Priority Data

May 13, 2014 (GB) .................................. 1408415.6

(51) Int. Cl.
*F02C 9/18* (2006.01)
*F02C 7/18* (2006.01)
(Continued)

(52) U.S. Cl.
CPC ................. *F02C 9/18* (2013.01); *F01D 9/02* (2013.01); *F01D 9/065* (2013.01); *F01D 25/24* (2013.01);
(Continued)

(58) Field of Classification Search
CPC .... F02C 9/18; F02C 7/18; F02C 7/185; F02C 7/14; F02C 7/141; F05D 2260/213;
(Continued)

(56) References Cited

U.S. PATENT DOCUMENTS 4,080,785 A * 3/1978 Koff ...................... F02K 3/075
415/69
5,203,163 A 4/1993 Parsons
(Continued)

FOREIGN PATENT DOCUMENTS

EP 0 469 827 A1 2/1992
EP 1 574 668 A2 9/2005
(Continued)

OTHER PUBLICATIONS

Oct. 9, 2015 Search Report issued in European Patent Application No. 15 16 6493.
(Continued)

*Primary Examiner* — Andrew H Nguyen
(74) *Attorney, Agent, or Firm* — Oliff PLC

(57) ABSTRACT

A gas turbine engine is disclosed including a bifurcation fairing located in a bypass duct of the gas turbine engine and traversing the radial extent of the bypass duct. The bifurcation fairing has a delivery conduit inlet leading to a delivery conduit extending inside the bifurcation fairing, the delivery conduit being arranged in use for delivery of bypass air to one or more components of the gas turbine engine. A diverter conduit has a diverter conduit inlet from the delivery conduit upstream of the delivery conduit reaching the one or more components of the gas turbine engine. The diverter conduit has an outlet to a location other than the one or more components of the gas turbine engine.

11 Claims, 2 Drawing Sheets

(51) Int. Cl.
*F02C 6/08* (2006.01)
*F01D 9/02* (2006.01)
*F01D 25/24* (2006.01)
*F02K 3/06* (2006.01)
*F01D 9/06* (2006.01)
*F02C 7/14* (2006.01)
*F02K 3/115* (2006.01)

(52) U.S. Cl.
CPC .................. *F02C 6/08* (2013.01); *F02C 7/14* (2013.01); *F02C 7/18* (2013.01); *F02C 7/185* (2013.01); *F02K 3/06* (2013.01); *F02K 3/115* (2013.01); *Y02T 50/675* (2013.01)

(58) Field of Classification Search
CPC .... F05D 2260/606; F02K 3/115; F02K 3/075; F02K 3/077; Y10T 137/86726; Y10T 137/86718; Y10T 137/0379; Y10T 137/0525
See application file for complete search history.

(56) References Cited

U.S. PATENT DOCUMENTS

| | | | | |
|---|---|---|---|---|
| 5,806,303 | A * | 9/1998 | Johnson | ..................... F02K 1/30 60/226.1 |
| 7,810,312 | B2 * | 10/2010 | Stretton | ................. F02C 7/141 60/226.1 |
| 2008/0028763 | A1 | 2/2008 | Schwarz et al. | |
| 2008/0230651 | A1 | 9/2008 | Porte | |
| 2009/0288387 | A1 | 11/2009 | Baltas | |
| 2009/0317238 | A1 | 12/2009 | Wood et al. | |
| 2010/0126182 | A1 * | 5/2010 | Hoover | ................. F01D 17/105 60/785 |
| 2012/0102915 | A1 | 5/2012 | Baltas | |
| 2012/0272658 | A1 | 11/2012 | Murphy | |

FOREIGN PATENT DOCUMENTS

| | | |
|---|---|---|
| EP | 2 031 213 A2 | 3/2009 |
| EP | 2 604 837 A2 | 6/2013 |
| GB | 2 437 377 A | 10/2007 |
| WO | 2014/055152 A2 | 4/2014 |

OTHER PUBLICATIONS

Oct. 6, 2015 Search Report issued in European Patent Application No. 15164984.

Nov. 25, 2014 Search Report issued in British Application No. 1408415.6.

U.S. Appl. No. 14/705,550 filed May 6, 2015 in the name of Beecroft, et al.

* cited by examiner

FLUID SYSTEM

The present disclosure concerns fluid systems and gas turbine engines. The disclosure may have particular application in a fluid system for the delivery of gas turbine engine bypass duct cooling air to a pre-cooler for use in cooling hotter, higher pressure compressor bleed air. Further and for convenience the background provided below is set in the context of such gas turbine engine implementation. The disclosure is not however limited to such applications and may be applicable to many situations where it is desirable to modulate fluid flow to one or more components without the modulation significantly impacting on upstream back pressure and/or flow field.

In turbofan gas turbine engines there is a need to allow various conduits and/or cables to cross a bypass duct of the gas turbine engine in order that services can reach the core. These conduits and cables are typically housed in a bifurcation fairing, which provides protection for the components and an aerodynamic profile to reduce drag in the bypass duct. The bifurcation fairing traverses the radial extent of the bypass duct and is typically positioned nearby and downstream of an array of outlet guide vanes, which are themselves downstream of a fan rotor of the gas turbine engine. The bifurcation fairing typically has a nose at its upstream end which widens into a bifurcation main body extending downstream. The bifurcation fairing can be further used to enclose engine mounts and pylon structure used to support the engine with respect to an aircraft.

It is known to provide an inlet through the wall of the bifurcation fairing to allow collection of bypass duct air. Often such air is delivered, via a delivery conduit, to a heat exchanger located within the bifurcation fairing. The heat exchanger is typically used as part of the aircraft environmental control system, designed to deliver compressor bleed air to the cabin at a conditioned temperature, pressure and flow for the passengers. The temperature of air bled from the compressor is controlled during the flight phase accounting for cabin requirements and engine operating regime. The desired temperature is typically achieved via modulating the volume of bypass duct air supplied to the heat exchanger by the delivery conduit, with a valve being used to selectively reduce or even prevent the flow of bypass duct air to the heat exchanger.

From the point of view of the properties of the bypass duct air collected, it is often desirable that the inlet should be as close to the outlet guide vanes as possible. This tends to lead to collection of air that is at the highest available pressure and lowest speed. Typically therefore the inlet may be provided in the leading edge of the splitter nose or on a bifurcation fairing side wall proximate the leading edge.

As the flow of bypass duct air to the heat exchanger is modulated this tends to cause changes in pressure at the inlet to the delivery conduit. This in turn may create variations of the aerodynamic environment in the bypass duct particularly upstream of the delivery conduit inlet. This may be inefficient and disadvantageous, especially where the aerodynamic performance of upstream outlet guide vanes are compromised, the likelihood of which may be increased by their proximity to the delivery conduit inlet for the reasons previously described.

According to a first aspect of the invention, there is provided a gas turbine engine comprising optionally a bifurcation fairing optionally located in a bypass duct of the gas turbine engine and optionally traversing the radial extent of the bypass duct, the bifurcation fairing optionally having a delivery conduit inlet optionally leading to a delivery conduit optionally extending inside the bifurcation fairing, the delivery conduit being optionally arranged in use for delivery of bypass air to one or more components of the gas turbine engine, and where further a diverter conduit optionally has a diverter conduit inlet from the delivery conduit optionally upstream of the delivery conduit reaching the one or more components of the gas turbine engine, the diverter conduit optionally having an outlet to a location other than the one or more components of the gas turbine engine. The provision of the bypass conduit, allowing air to bypass the one or more components of the gas turbine engine, may reduce back pressure variations at the inlet of the delivery conduit brought about by any modulation of the flow (as supplied by the delivery conduit) through the one or more components.

In some embodiments a valve is provided arranged to allow selective, at least partial closing of at least a portion of the delivery conduit. This may be desirable in order that the flow through the one or more components of the gas turbine engine can be modulated in accordance with their requirement for air at a particular time. As will be appreciated the portion of the delivery conduit may be a portion downstream of the delivery conduit inlet, such that the diverter conduit is not closed by closure of the portion of the delivery conduit.

Where the word closing is used throughout this specification it will be appreciated that this is intended to cover any closure that prevents the continued transit of air through the relevant conduit. It is not therefore intended to be limited to blocking of a conduit at any particular location (e.g. at an upstream end).

In some embodiments the valve is arranged to allow selective, at least partial closing of the diverter conduit. This may be desirable in order that some or all of the air entering the delivery conduit is not channelled away from the one or more components of the gas turbine engine where it is desirable that they receive that air.

In some embodiments the valve is arranged such that opening of the diverter conduit by the valve gives rise to closing of the delivery conduit by the valve and vice versa. This may mean that relative air flow through the one or more components and through the diverter conduit can be modulated using a single valve.

In some embodiments the one or more components of the gas turbine engine comprise one or more transit channels through which in use the air supplied by the delivery conduit passes and is exhausted to an exhaust conduit having an outlet from which the air is vented. The exhaust conduit outlet might for example be to the bypass duct. Alternatively it may be to another location such as overboard from the gas turbine engine or into a ventilation zone.

In some embodiments the delivery conduit, the one or more transit channels, the exhaust conduit and the diverter conduit are sized so as actuation of the valve throughout its range of operation gives rise to substantially no variation in pressure at the delivery conduit inlet. This may mean that an off-take flow from the bypass duct through the inlet to the delivery duct may be maintained at a substantially constant level regardless of any modulation of the flow to the one or more components of the gas turbine engine as selectively controllable via the valve. Pressure losses may therefore be reduced. Further the aerodynamic environment upstream of the delivery conduit inlet may be made less variable which may in turn allow greater design freedom for any outlet guide vanes upstream of the delivery conduit inlet.

In some embodiments the valve is located at the diverter conduit inlet.

In some embodiments the minimum flow area in the delivery conduit upstream of the diverter conduit inlet is substantially the same size as or smaller than the minimum flow area found anywhere throughout the delivery conduit downstream of the diverter conduit inlet, the total through all of the one or more transit channels, the exhaust conduit and the diverter conduit and where further the minimum flow area in the delivery conduit upstream of the diverter conduit inlet is the material flow area in terms of the flow rate of fluid entering the delivery conduit.

In some embodiments the valve is located at the diverter conduit outlet.

In some embodiments the diverter conduit outlet is to the exhaust conduit. In alternative embodiments however the diverter conduit outlet exhausts air separately e.g. directly to the bypass duct, overboard from the gas turbine engine or into a ventilation zone.

In some embodiments the minimum flow area in the exhaust conduit downstream of the diverter conduit outlet is substantially the same size as or smaller than the minimum flow area found anywhere in the delivery conduit downstream of the diverter conduit inlet, the total through all of the one or more transit channels, the exhaust conduit upstream of the diverter conduit outlet and the diverter conduit and where further the minimum flow area in the exhaust conduit downstream of the diverter conduit outlet is the material flow area in terms of the flow rate of fluid entering the delivery conduit.

As will be appreciated, there may be embodiments where there are multiple examples of at least one, but fewer than all of the delivery conduit, exhaust conduit and diverter conduit combined with a single example of at least one, but fewer than all of the delivery conduit, exhaust conduit and diverter conduit. In such instances and/or to account for such instances it will be appreciated that where the phrase minimum flow area is used above, it may be replaced with total minimum flow area through the relevant features of which there are more than one example. As will be appreciated the minimum flow area through each of the multiple features contributing to the total minimum flow area will not necessarily occur at corresponding locations within the features of which there are multiple examples. Instead it will simply be the minimum flow area anywhere in the relevant feature.

In some embodiments the bifurcation fairing has a nose portion.

In some embodiments the nose portion blends into the trailing edge of an outlet guide vane upstream of the bifurcation fairing. This may reduce the aerodynamic impact of the bifurcation fairing which may have a main body circumferentially wider than the outlet guide vane.

In some embodiments the delivery conduit intake is provided on a side wall of the bifurcation fairing. Further in some embodiments the intake may comprise an air scoop.

In some embodiments the delivery conduit inlet is provided at a leading edge of the nose portion. This is commonly known as a pitot inlet.

In some embodiments the diverter conduit and delivery conduit are arranged such that a boundary layer flow entering the delivery conduit passes into the diverter conduit rather than the delivery conduit. It may be for example that a wall of the diverter conduit is substantially continuous with a side wall of the bifurcation fairing. More specifically in the case of delivery conduit intake on the side wall of the bifurcation fairing, the diverter conduit may be positioned nearer to the circumferential centre of the bifurcation fairing than the delivery conduit from which its diverter conduit inlet is provided. In the case of a delivery conduit intake at a leading edge of the nose portion, the diverter conduit may be positioned nearer to a circumferential periphery of the bifurcation fairing than the delivery conduit from which its diverter conduit inlet is provided. Such arrangements may improve pressure recovery. Specifically a boundary layer tends to slow air as it is taken from the bypass duct and progresses through the delivery conduit. By removing the boundary layer at a relatively early stage in the diverter conduit, pressure recovery for the remaining air entering the delivery conduit may be consequently improved.

In some embodiments the delivery conduit is a diffuser, having an expanding cross-section in a downstream direction.

In some embodiments the one or more components of the gas turbine engine are inside the bifurcation fairing.

In some embodiments at least one of the one or more components of the gas turbine engine is a heat exchanger. The heat exchanger may for example be a pre-cooler arranged to cool compressor bleed air for use in environmental control, cooling and/or sealing applications.

According to a second aspect of the invention there is provided a fluid system optionally having a delivery conduit inlet optionally leading to a delivery conduit optionally arranged in use for delivery of fluid to one or more components, and where further a diverter conduit optionally has a diverter conduit inlet from the delivery conduit optionally upstream of the delivery conduit reaching the one or more components, the diverter conduit optionally having an outlet to a location other than the one or more components and where the system further optionally comprises a valve optionally arranged to allow selective, at least partial, closing of the delivery conduit and optionally selective, at least partial closing of the diverter conduit, the valve optionally being further arranged such that opening of the diverter conduit by the valve gives rise to closing of the delivery conduit by the valve and vice versa and where further the system optionally comprises one or more transit channels through which in use the air supplied by the delivery conduit passes and is optionally exhausted to an exhaust conduit having an outlet from which the air is vented and where optionally further the delivery conduit, the one or more transit channels, the exhaust conduit and the diverter conduit are sized so as actuation of the valve throughout its range of operation gives rise to substantially no variation in pressure at the delivery conduit inlet.

In some embodiments the valve is located at the diverter conduit inlet.

In some embodiments the minimum flow area in the delivery conduit upstream of the diverter conduit inlet is substantially the same size as or smaller than the minimum flow area found anywhere throughout the delivery conduit downstream of the diverter conduit inlet, the total through all of the one or more transit channels, the exhaust conduit and the diverter conduit and where further the minimum flow area in the delivery conduit upstream of the diverter conduit inlet is the material flow area in terms of the flow rate of fluid entering the delivery conduit.

In some embodiments the diverter conduit outlet is to the exhaust conduit.

In some embodiments the minimum flow area in the exhaust conduit downstream of the diverter conduit outlet is substantially the same size as or smaller than the minimum flow area found anywhere in the delivery conduit downstream of the diverter conduit inlet, the total through all of the one or more transit channels, the exhaust conduit upstream of the diverter conduit outlet and the diverter conduit and where further the minimum flow area in the exhaust conduit downstream of the diverter conduit outlet is the material flow area in terms of the flow rate of fluid entering the delivery conduit.

In some embodiments the valve is located at the diverter conduit outlet.

In some embodiments the bifurcation fairing has a nose portion.

In some embodiments the nose portion blends into the trailing edge of an outlet guide vane upstream of the bifurcation fairing.

In some embodiments the delivery conduit intake is provided on a side wall of the bifurcation fairing. Further in some embodiments the intake may comprise an air scoop.

In some embodiments the delivery conduit inlet is provided at a leading edge of the nose portion. This is commonly known as a pitot inlet.

In some embodiments the diverter conduit and delivery conduit are arranged such that a boundary layer flow entering the delivery conduit passes into the diverter conduit rather than the delivery conduit. It may be for example that a wall of the diverter conduit is substantially continuous with a side wall of the bifurcation fairing. More specifically in the case of delivery conduit intake on the side wall of the bifurcation fairing, the diverter conduit may be positioned nearer to the circumferential centre of the bifurcation fairing than the delivery conduit from which its diverter conduit inlet is provided. In the case of a delivery conduit intake at a leading edge of the nose portion, the diverter conduit may be positioned nearer to a circumferential periphery of the bifurcation fairing than the delivery conduit from which its diverter conduit inlet is provided.

In some embodiments the delivery conduit is a diffuser, having an expanding cross-section in a downstream direction.

In some embodiments at least one of the one or more components is a heat exchanger.

The skilled person will appreciate that except where mutually exclusive, a feature described in relation to any one of the above aspects of the invention may be applied mutatis mutandis to any other aspect of the invention.

Embodiments of the invention will now be described by way of example only, with reference to the Figures, in which.

Figure 1:
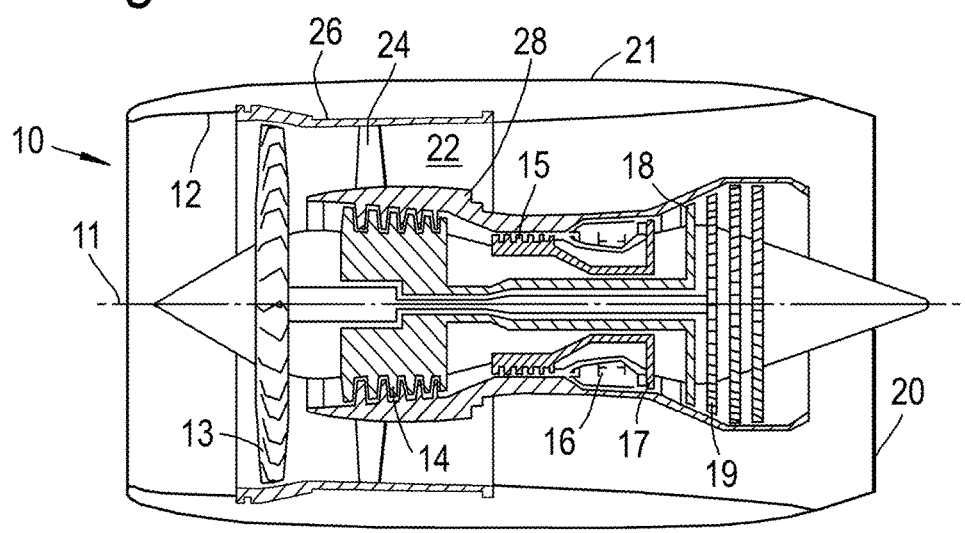
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

The second air flow produced by the fan 13 which passes through the bypass duct 22 flows past an annular array of outlet guide vanes 24, before continuing downstream through the bypass duct 22. The outlet guide vanes 24 reduce the swirl of the second flow as it travels down the bypass duct 22 as well as transferring load from a fan case 26 to the core casing 28.

Figure 2:
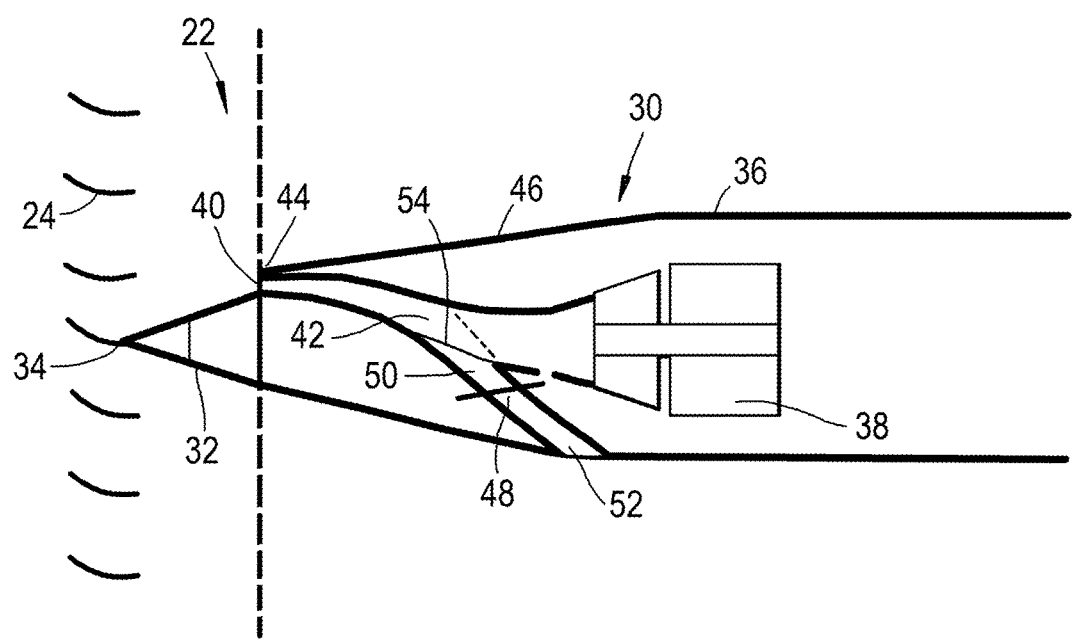
FIG. 2 is a schematic top cross-sectional view of part of a bypass duct in accordance with the invention.

Referring now to FIG. 2 a schematic top cross-sectional view of part of the bypass duct 22 of the gas turbine engine 10 is shown. A fluid system associated with the bypass duct 22 is described below. Extending within the bypass duct 22, downstream of the outlet guide vanes 24, is a bifurcation fairing generally shown at 30. The bifurcation fairing 30 traverses the radial extent of the bypass duct 22, providing an aerodynamic housing for an array of conduits (not shown) and cables (not shown) crossing the bypass duct 22. The bifurcation fairing 30 has at its upstream end a nose portion 32 which blends into a trailing edge 34 of one of the outlet guide vane 24. The nose portion 32 is wedge shaped, increasing in circumferential width from the outlet guide vane 24 towards a bifurcation fairing main body 36 downstream of the nose portion 32. The main body 36 continues the increase in circumferential width in the downstream direction introduced by the nose portion 32 until it ultimately maintains a substantially consistent circumferential width.

Provided inside the main body 36 of the bifurcation fairing 30 is a component of the gas turbine engine, specifically a pre-cooler 38, arranged to receive a supply of air from the bypass duct 22. Bypass duct air is supplied to the pre-cooler 38 via a delivery conduit inlet 40 and through a delivery conduit 42 formed as a diffuser. The delivery conduit inlet 40 is formed as a scoop 44 and provided on a side wall 46 of the bifurcation fairing 30 proximate the nose portion 32. The delivery conduit 42 extends inside the bifurcation fairing 30 between the delivery conduit inlet 40 and pre-cooler 38, increasing in cross-sectional area in the downstream direction.

The delivery conduit 42 is in fluid communication with a plurality of transit channels (not shown), in this case heat exchange channels, through the pre-cooler 38. At a downstream end of the transit channels there is provided an exhaust conduit (not shown) in fluid communication therewith. The exhaust conduit has an exhaust conduit outlet (not shown) to a lower pressure region (in this case the bypass duct 22).

Branching off from the delivery conduit 42 upstream of the pre-cooler 38 is a diverter conduit 48. The diverter conduit 48 has a diverter conduit inlet 50 from the delivery conduit 42 and a diverter conduit outlet 52 to a location other than the pre-cooler 38, and in this case to the bypass duct 22.

A flap valve 54 is located at the diverter conduit inlet 50 and is selectively actuatable between extremes of travel in which it closes a portion of the delivery conduit 42 downstream of the diverter conduit inlet 50 and closes the diverter conduit 48 respectively. The position of the valve 54 is also continuously variable such that any position between these extremes may be selected. As will be appreciated the valve 54 is therefore arranged such that opening of the portion of the diverter conduit 48 by the valve 54 gives rise to closing of the delivery conduit 42 by the valve 54 and vice versa.

In use of the FIG. 2 arrangement, air driven into the bypass duct 22 by the fan 13 passes the array of outlet guide vanes 24. A proportion of the air is captured by the scoop 44, whereupon it enters the delivery conduit inlet 40 and travels along the delivery conduit 42 towards the pre-cooler 38. Assuming the valve 54 is configured to close the diverter conduit 48, at least a proportion of the air will continue on in the delivery conduit and arrive at the pre-cooler 38. Travelling through the transit channels of the pre-cooler 38, the relatively low pressure, low temperature air supplied via the delivery conduit 42 cools relatively high pressure, high temperature air supplied to the pre-cooler 38 from a compressor bleed (not shown) of the gas turbine engine 10. Once cooled in the pre-cooler 38, the relatively high pressure compressor bleed air is transported to the cabin of an aircraft with which the gas turbine engine 10 is associated. The relatively low pressure air passing through the transit channels is exhausted to the exhaust conduit and vented back into the bypass duct 22 via the exhaust conduit outlet.

As will be appreciated the configuration of the valve 54 is varied by a controller (not shown) e.g. an engine electronic controller or an environmental controller, in order to modulate the quantity of bypass duct 22 air reaching the pre-cooler 38 in accordance with cabin air-conditioning requirements. Thus the valve 54 might for instance be configured to allow a relatively high volume of bypass duct 22 air to reach the pre-cooler 38 where for instance there is demand for relatively high degree of cooling and/or demand for a relatively high volume of cooled compressor bleed air. By contrast the valve 54 might for instance be configured to allow a relatively low volume of bypass duct 22 air to reach the pre-cooler 38 where for instance there is demand for only relatively little cooling and/or demand for a relatively low volume of cooled compressor bleed air.

As the valve 54 is modulated the diverter conduit 48 limits the extent to which the pressure at the delivery conduit inlet 40 varies. Specifically, even where the portion of the delivery conduit 42 is closed completely by the valve 54, the diverter conduit 48 ensures that the delivery conduit inlet 40 is not completely closed, with the diverter conduit 48 providing an alternative path for the bypass duct 22 air entering the delivery conduit inlet 40 and allowing it to return to the bypass duct 22. Nonetheless, there will still be variation in the total flow area presented by the portion of the delivery conduit 42 and diverter conduit 48 as the valve 54 is modulated. Modifications to the embodiment of FIG. 2 are therefore envisaged as discussed further below.

Figure 3:
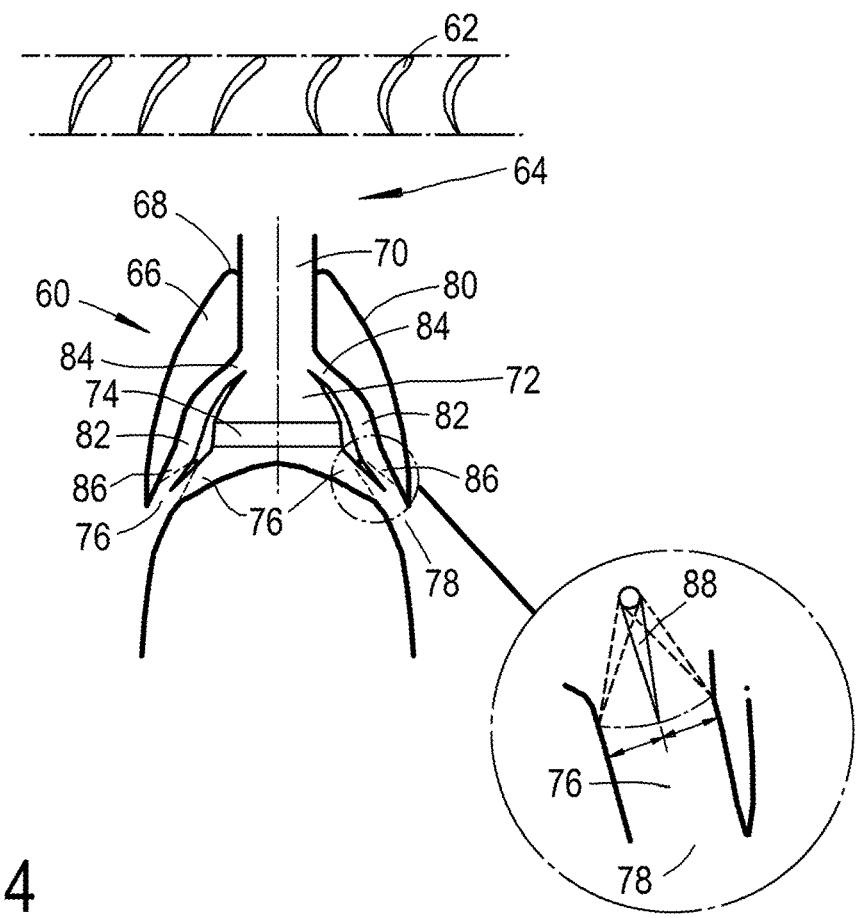
FIG. 3 is a top cross-sectional view of part of a bypass duct in accordance with the invention.

Referring now to FIG. 3 a top cross-sectional view of part of an alternative bifurcation fairing is generally shown at 60 downstream of an array of outlet guide vanes 62 and provided in a bypass duct 64. The associated fluid system is described below.

The bifurcation fairing 60 has a nose portion 66 with a nose leading edge 68. The nose leading edge 68 is separated from the outlet guide vanes 62. Provided in the nose leading edge 68 is a delivery conduit inlet 70 to a delivery conduit 72. The delivery conduit 72 leads to a pre-cooler 74, and specifically to transit channels (not shown) through the pre-cooler 74. The transit channels exhaust into two exhaust conduits 76, one having an exhaust conduit outlet 78 through one side wall 80 of the bifurcation fairing 60 and the other having an exhaust conduit outlet 78 through an opposite side wall 80 of the bifurcation fairing 60 each to the bypass duct 64.

The bifurcation fairing 60 is also provided with a pair of diverter conduits 82, each having a diverter conduit inlet 84 off of the delivery conduit 72. The diverter conduits 82 are provided adjacent opposite side walls 80 of the bifurcation fairing 60, with the delivery conduit 72 passing between them. Each of the diverter conduits 82 has a diverter conduit outlet 86 to a location other than the pre-cooler 74 and in this case to one of the respective exhaust conduits 76. Further a flap valve 88 is provided at each diverter conduit outlet 86. Each valve 88 is selectively actuatable between extremes of travel in which it closes the respective delivery conduit 72 and closes the respective diverter conduit 82 respectively. The position of the valve 88 is also continuously variable such that any position between these extremes may be selected. As will be appreciated the valve 88 is therefore arranged such that opening of the relevant diverter conduit 82 by the valve 88 gives rise to closing of the delivery conduit 72 by the valve 88 and vice versa.

In the FIG. 3 embodiment the delivery conduit 72, transit channels, exhaust conduits 76 and diverter conduits 82 are sized so as actuation of the valve 88 throughout its range of movement gives rise to substantially no variation in pressure at the delivery conduit inlet 70. More specifically the total minimum flow area in the exhaust conduits 76 downstream of the respective diverter conduit outlets 86 is substantially the same size as or smaller than the minimum flow area found in the delivery conduit 72 downstream of the diverter conduit inlet 84, the total minimum flow area through all of the transit channels, the total minimum flow area found in the exhaust conduits 76 upstream of the diverter conduit outlets 86 and the total minimum flow area found in the diverter conduits 82 and where further the total minimum flow area in the exhaust conduits 76 downstream of the diverter conduit outlets 86 is the material flow area in terms of the flow rate of fluid entering the delivery conduit 72. The flow area in each exhaust conduit 76 downstream of the respective diverter conduit outlet 86 is fixed.

In use of the arrangement of FIG. 3, bypass duct air entering the delivery conduit inlet 70 passes either though the pre-cooler 74 or through one of the diverter conduits 82. The relative proportion of the air passing through the pre-cooler 74 and the diverter conduits 82 is selectively variable through actuation of the valves 88. The valves 88, under the control of a controller (not shown), are continuously variable between extremes of travel at which either the respective exhaust conduit 76 or respective diverter conduit 82 is closed. Despite this, actuation of the valves 88 in order to modulate the flow to the pre-cooler does not substantively impact on the pressure at the delivery conduit inlet 70. This is because the exhaust conduits 76 downstream of the respective diverter conduit outlets 86 provide the material minimum total flow area in terms of the flow rate of fluid entering the delivery conduit 72. This is not altered by adjustment of the valve 88 positions.

Furthermore, in view of the diverter conduits 82 being positioned nearer to the circumferential periphery of the bifurcation fairing 60 than the delivery conduit 72, at least part of a boundary layer travelling adjacent a side wall of the delivery conduit 72 upstream of the diverter conduit inlets 84 tends to pass into the diverter conduits 82 rather than continue on towards the pre-cooler 74.

Figure 4:
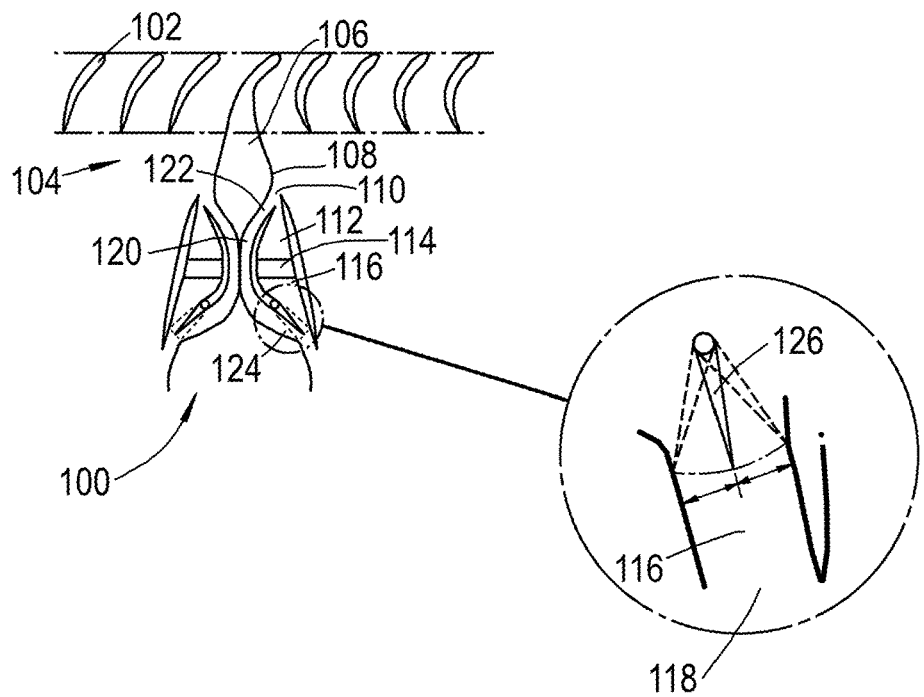
FIG. 4 is a top cross-sectional view of part of a bypass duct in accordance with the invention.

Referring now to FIG. 4 a top cross-sectional view of part of an alternative bifurcation fairing is generally shown at 100 downstream of an array of outlet guide vanes 102 and provided in a bypass duct 104. The associated fluid system is described below.

The bifurcation fairing 100 has a nose portion 106 which blends into one of the upstream outlet guide vanes 102. Provided on a side wall 108 of the bifurcation fairing 100 proximate the nose portion 106 is a delivery conduit inlet 110 to a delivery conduit 112. The delivery conduit 112 leads to a pre-cooler 114, and specifically to transit channels (not shown) through the pre-cooler 114. The transit channels exhaust into an exhaust conduit 116 having an exhaust conduit outlet 118 through the side wall 108 of the bifurcation fairing 100.

The bifurcation fairing 100 is also provided with a diverter conduit 120 having a diverter conduit inlet 122 off of the delivery conduit 112. The delivery conduit 112 is provided between the diverter conduit 120 and the side wall 108. The diverter conduit 120 has a diverter conduit outlet 124 to a location other than the pre-cooler 114 and in this case to the exhaust conduits 116. Further a flap valve 126 is provided at the diverter conduit outlet 124. The valve 126 is selectively actuatable between extremes of travel in which it closes the delivery conduit 112 and closes the diverter conduit 120 respectively. The position of the valve 126 is also continuously variable such that any position between these extremes may be selected. As will be appreciated the valve 126 is therefore arranged such that opening of the diverter conduit 120 by the valve 126 gives rise to closing of the delivery conduit 112 by the valve 126 and vice versa.

In the FIG. 4 embodiment the delivery conduit 112, transit channels, exhaust conduit 116 and diverter conduit 120 are sized so as actuation of the valve 126 throughout its range of movement gives rise to substantially no variation in pressure at the delivery conduit inlet 110. More specifically the minimum flow area in the exhaust conduit 116 downstream of the diverter conduit outlet 124 is substantially the same size as or smaller than the minimum flow area found in the delivery conduit 112 downstream of the diverter conduit inlet 122, the total minimum flow area through all of the transit channels, the minimum flow area found in the exhaust conduit 116 upstream of the diverter conduit outlet 124 and the minimum flow area found in the diverter conduit 120 and where further the minimum flow area in the exhaust conduit 116 downstream of the diverter conduit outlet 124 is the material flow area in terms of the flow rate of fluid entering the delivery conduit 112.

In use of the arrangement of FIG. 4, bypass duct air entering the delivery conduit inlet 110 passes either though the pre-cooler 114 or through the diverter conduit 120. The relative proportion of the air passing through the pre-cooler 114 and the diverter conduit 120 is selectively variable through actuation of the valve 126. The valve 126, under the control of a controller (not shown), is continuously variable between extremes of travel at which either the exhaust conduit 116 or diverter conduit 120 is closed. Despite this, actuation of the valve 126 in order to modulate the flow to the pre-cooler 114 does not substantively impact on the pressure at the delivery conduit inlet 110. This is because the exhaust conduit 116 downstream of the diverter conduit outlet 124 provides the material minimum flow area in terms of the flow rate of fluid entering the delivery conduit 112. This is not altered by adjustment of the valve 126 position.

Furthermore, in view of the diverter conduit 120 being positioned further from the side wall 108 than the delivery conduit 112, at least part of a boundary layer travelling adjacent the side wall 108 and entering the delivery conduit 112 tends to pass into the diverter conduit 120 rather than continuing on towards the pre-cooler 114.

As can be seen the arrangement described above is repeated in mirror image and associated with an opposite side wall of the bifurcation duct. The arrangements are not however in fluid communication.

It will be understood that the invention is not limited to the embodiments above-described and various modifications and improvements can be made without departing from the concepts described herein. By way of example it may be that a minimum flow area in the delivery conduit upstream of the diverter conduit inlet(s) is the material flow area in terms of the flow rate of fluid entering the delivery conduit regardless of valve configuration. Except where mutually exclusive, any of the features may be employed separately or in combination with any other features and the disclosure extends to and includes all combinations and sub-combinations of one or more features described herein.

The invention claimed is:

1. A fluid system configured to control delivery of gas turbine engine bypass duct cooling air in a gas turbine engine, the fluid system comprising:
   a bifurcation fairing located in a bypass duct of the gas turbine engine, the bifurcation fairing having including:
   a nose portion that blends into one of a plurality of upstream outlet guide vanes of the gas turbine engine;
   a delivery conduit inlet proximate to the nose portion, the delivery conduit leading to a pre-cooler arranged to cool air for use in environmental control;
   a delivery conduit connected to the delivery conduit inlet, the delivery conduit being configured to deliver bypass duct cooling air to the pre-cooler;
   a diverter conduit having a diverter conduit inlet disposed upstream of the pre-cooler and extending to an outlet disposed in a location other than the pre-cooler;
   a valve configured to selectively partially close the delivery conduit and selectively partially close the diverter conduit, the valve being configured such that opening of the diverter conduit by the valve closes the delivery conduit by the valve and vice versa; and
   one or more transit channels through which in use the air supplied by the delivery conduit passes and is exhausted to an exhaust conduit having an outlet from which the air is vented, wherein
   the delivery conduit, the one or more transit channels, the exhaust conduit and the diverter conduit are sized such that actuation of the valve throughout a range of operation of the valve causes substantially no variation in pressure at the delivery conduit inlet.

2. The fluid system according to claim 1, wherein the valve is located at the diverter conduit outlet.

3. The fluid system according to claim 1, wherein the diverter conduit outlet is connected to the exhaust conduit.

4. The fluid system according to claim 3, wherein:
   the minimum flow area in the exhaust conduit downstream of the diverter conduit outlet is substantially the same size as or smaller than: (i) the minimum flow area found anywhere in the delivery conduit downstream of the diverter conduit inlet, (ii) a total through area of all of the one or more transit channels, (iii) the minimum flow area of the exhaust conduit upstream of the diverter conduit outlet, and (iv) the minimum flow area of the diverter conduit; and the minimum flow area in the exhaust conduit downstream of the diverter conduit outlet is the material flow area in terms of the flow rate of fluid entering the delivery conduit.

5. The fluid system according to claim 1, wherein the diverter conduit and delivery conduit are arranged such that a boundary layer flow entering the delivery conduit passes into the diverter conduit rather than the delivery conduit.

6. A gas turbine engine comprising the fluid system of claim 1.

7. The gas turbine engine according to claim 6, wherein the valve is located at the diverter conduit outlet.

8. The gas turbine engine according to claim 6, wherein the diverter conduit outlet is connected to the exhaust conduit.

9. The gas turbine engine according to claim 8, wherein the minimum flow area in the exhaust conduit downstream of the diverter conduit outlet is substantially the same size as or smaller than the minimum flow area found in the delivery conduit downstream of the diverter conduit inlet, the total through all of the one or more transit channels, the exhaust conduit upstream of the diverter conduit outlet and the diverter conduit, and the minimum flow area in the exhaust conduit downstream of the diverter conduit outlet is the material flow area in terms of the flow rate of fluid entering the delivery conduit.

10. The gas turbine engine according to claim 6, wherein the diverter conduit and delivery conduit are arranged such that a boundary layer flow entering the delivery conduit passes into the diverter conduit rather than the delivery conduit.

11. The gas turbine engine according to claim 6, wherein the pre-cooler is disposed inside the bifurcation fairing.

* * * * *